US007649726B2

(12) United States Patent
Castro

(10) Patent No.: US 7,649,726 B2
(45) Date of Patent: Jan. 19, 2010

(54) PROTECTION CIRCUIT FOR GENERAL-PURPOSE DIGITAL I/O LINES

(75) Inventor: Rafael Castro, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 122 days.

(21) Appl. No.: 10/936,632

(22) Filed: Sep. 8, 2004

(65) Prior Publication Data

US 2005/0078427 A1    Apr. 14, 2005

Related U.S. Application Data

(60) Provisional application No. 60/601,859, filed on Aug. 16, 2004.

(51) Int. Cl.
    *H02H 7/00* (2006.01)
(52) U.S. Cl. .................................. 361/119; 361/111
(58) Field of Classification Search .................. 361/56, 361/91.1, 111, 118–119; 257/355–358
    See application file for complete search history.

(56) References Cited

U.S. PATENT DOCUMENTS

| | | | | |
|---|---|---|---|---|
| 4,513,309 A * | 4/1985 | Cricchi | ....................... | 257/376 |
| 4,876,713 A * | 10/1989 | Crosby et al. | ................ | 379/412 |
| 5,023,672 A * | 6/1991 | Paquette | ...................... | 257/472 |
| 5,430,595 A * | 7/1995 | Wagner et al. | ................. | 361/56 |
| 5,550,702 A * | 8/1996 | Schmidt et al. | ............. | 361/103 |
| 5,594,611 A | 1/1997 | Consiglio et al. | ........... | 361/118 |
| 5,610,425 A * | 3/1997 | Quigley et al. | ............... | 257/358 |
| 5,751,525 A * | 5/1998 | Olney | ........................... | 361/56 |
| 5,815,360 A | 9/1998 | Consiglio et al. | ........... | 361/118 |
| 5,892,971 A * | 4/1999 | Danielson et al. | ............... | 710/7 |
| 5,896,263 A * | 4/1999 | Terdan et al. | ................ | 361/101 |
| 6,104,588 A | 8/2000 | Hariton et al. | .............. | 361/111 |
| 6,414,831 B1 * | 7/2002 | Orchard-Webb | ............ | 361/111 |
| 6,483,365 B2 * | 11/2002 | Morishita | .................... | 327/314 |
| 6,495,863 B2 | 12/2002 | Narazaki | ..................... | 257/106 |
| 6,628,498 B2 * | 9/2003 | Whitney et al. | ............. | 361/119 |
| 6,671,146 B1 * | 12/2003 | Hashimoto et al. | ............ | 361/56 |
| 6,700,766 B2 | 3/2004 | Sata | .......................... | 361/93.1 |
| 6,801,416 B2 * | 10/2004 | Hatzilambrou et al. | ........ | 361/56 |
| 6,882,014 B2 | 4/2005 | Tan | ............................ | 257/369 |
| 6,882,513 B2 | 4/2005 | Laraia | ........................ | 361/91.1 |
| 6,924,963 B2 * | 8/2005 | Young et al. | ................. | 361/111 |
| 7,042,197 B2 * | 5/2006 | Turner et al. | ................. | 320/136 |
| 7,075,763 B2 * | 7/2006 | Marr | ........................... | 361/56 |
| 7,161,404 B2 * | 1/2007 | Hazucha et al. | ............. | 327/203 |

(Continued)

*Primary Examiner*—Fritz M Fleming
*Assistant Examiner*—Terrence R Willoughby
(74) *Attorney, Agent, or Firm*—Meyertons Hood Kivlin Kowert & Goetzel, P.C.; Jeffrey C. Hood

(57) ABSTRACT

A protection circuit for protecting a device from destructive electrical conditions, such as ESD, over-voltage, and over-current, while keeping the output impedance of the device's I/O lines to a minimum, and self-regulating power dissipation. The device may comprise a first protection circuit and a second protection circuit coupled to each of one or more I/O lines for providing a primary and a secondary level of protection, respectively, for the I/O lines. The first protection circuit of the device may combine the use of Schottky diodes for voltage clamping, with a current limiting device for self-regulating the power dissipation. The current limiting device may be operable to function as a small, low impedance resistor in a normal operating range and as a controlled power dissipater outside the normal operating range. The device may be a data acquisition device comprised in a data acquisition system.

46 Claims, 4 Drawing Sheets

U.S. PATENT DOCUMENTS

| | | | |
|---|---|---|---|
| 2002/0024791 A1* | 2/2002 | Whitney et al. | 361/119 |
| 2002/0050602 A1 | 5/2002 | Narazaki | 257/106 |
| 2004/0228059 A1 | 11/2004 | Mayama et al. | 361/100 |
| 2005/0017796 A1 | 1/2005 | Tanizawa | 327/562 |
| 2005/0068705 A1 | 3/2005 | Nakahara | 361/100 |
| 2006/0028780 A1* | 2/2006 | Pessl et al. | 361/111 |

* cited by examiner

PROTECTION CIRCUIT FOR GENERAL-PURPOSE DIGITAL I/O LINES

PRIORITY CLAIM

This application claims benefit of priority of U.S. provisional application Ser. No. 60/601,859 titled "Protection Circuit for General-Purpose Digital I/O Lines", filed Aug. 16, 2004, and whose inventor is Rafael Castro.

BACKGROUND OF THE INVENTION

1. Field of the Invention

This invention relates generally to measurement and data acquisition systems and, more particularly, to a circuit for protecting general-purpose digital input/output lines against destructive electrical conditions.

2. Description of the Related Art

Scientists and engineers often use measurement systems to perform a variety of functions, including measurement of a physical phenomena or unit under test (UUT), test and analysis of physical phenomena, process monitoring and control, control of mechanical or electrical machinery, data logging, laboratory research, and analytical chemistry, to name a few examples.

A typical measurement system comprises a computer system with a measurement device or measurement hardware. The measurement device may be a computer-based instrument, a data acquisition device or board, a programmable logic device (PLD), an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system through a PCI bus, PXI (PCI extensions for Instrumentation) bus, a GPIB (General-Purpose Interface Bus), a VXI (VME extensions for Instrumentation) bus, a serial port, parallel port, or Ethernet port of the computer system. Optionally, the measurement system includes signal conditioning devices which receive field signals and condition the signals to be acquired.

A measurement system may typically include transducers, sensors, or other detecting means for providing "field" electrical signals representing a process, physical phenomena, equipment being monitored or measured, etc. The field signals are provided to the measurement hardware. In addition, a measurement system may also typically include actuators for generating output signals for stimulating a UUT.

Measurement systems, which may also be generally referred to as data acquisition systems, may include the process of converting a physical phenomenon (such as temperature or pressure) into an electrical signal and measuring the signal in order to extract information. PC-based measurement and data acquisition (DAQ) systems and plug-in boards are used in a wide range of applications in the laboratory, in the field, and on the manufacturing plant floor, among others.

In a measurement or data acquisition process, analog signals may be received by a digitizer, which may reside in a DAQ device or instrumentation device. The analog signals may be received from a sensor, converted to digital data (possibly after being conditioned) by an Analog-to-Digital Converter (ADC), and transmitted to a computer system for storage and/or analysis. When a measurement system generates an output analog signal, the computer system may generate digital signals that are provided to one or more digital to analog converters (DACs) in the DAQ device. The DACs may convert the digital signal to an output analog signal that is used, e.g., to stimulate a UUT.

Multifunction DAQ devices typically include digital I/O capabilities in addition to the analog capabilities described above. Digital I/O applications may include monitoring and control applications, video testing, chip verification, and pattern recognition, among others. DAQ devices may include one or more general-purpose, bidirectional digital I/O lines to transmit and receive digital signals to implement one or more digital I/O applications.

General-purpose, bidirectional digital I/O lines are typically susceptible to destructive electrical conditions, such as over-voltage, over-current, and electrostatic discharge (ESD). A common solution to protect against over-voltage and/or ESD in electronic devices is to include one or more voltage clamping devices external to the device and on the lines to be protected to prevent damage from these electrical conditions. When the voltage rises above the voltage limit for the device, the voltage clamping devices may protect the device from over-voltage conditions by clamping or fixing the voltage at approximately the voltage limit. The voltage clamping device preferably sinks any excess current to block the current from damaging the device. In some implementations, two clamping diodes external to the device may be used for clamping the signal to the positive voltage rail and ground of the device. The diodes may keep the voltage at the protected node in check, as long as they can withstand the high currents that occur when the diodes starts clamping. Therefore, in some implementations, a clamping circuit such as this one may convert the problem of over-voltage into a problem of over-current.

Diodes typically have a limit on the peak current and the sustained current they can withstand. The sustained or continuous current limit is the maximum current the diodes are guaranteed to withstand for an undefined period of time without damage. Above this limit, the diode may only withstand the current for a limited period of time, i.e., the larger the current, the shorter the period of time. In the case of the circuit including two diodes, they may only offer protection against very short duration over-voltage conditions before the diodes themselves suffer damage. The current through the diodes may only be limited by the small impedance of the diodes themselves and the impedance of the voltage source associated with the voltage rails of the device. The I-V curve of a diode is an exponential function, and it typically does not take too much over-voltage to exceed the maximum continuous current of the diode.

It is an industry standard to protect all input and general-purpose, bidirectional I/O terminals in a semiconductor device with internal clamping diodes similar to the external clamping diodes described above. When the internal diodes are voltage clamping, there may be the added risk of activating a latchup condition which is a potentially self destructing mode the semiconductor can get into where the circuitry draws excess current, and may only get out of it by removing power to the semiconductor. The internal clamping diodes are typically designed to clamp over-voltage or ESD events which are very short on duration.

In other implementations, a resistor in series with the line to be protected may be added to the protection circuit described above to control the current once the diodes enter a clamping mode. The resistor may limit the current through the diodes when they are voltage clamping, which typically extends the over-voltage protection range, because it takes a greater over-voltage to reach the maximum continuous current of the diodes. However, at the same time the resistor may increase the line impedance in normal operation, which may reduce the normal current possible for a given output voltage. In sum, the higher the resistance of the resistor, the higher the over-voltage protection range, but typically the lower the performance of the device.

Furthermore, in the protection circuit described above, which includes the resistor in series with the I/O line, and the internal and external clamping diodes, there may also be a tradeoff between the power dissipation of the components and the level of protection. The equation for the power dissipation on the resistor is proportional to the square of the over-voltage and is inversely proportional to the resistor value. Power dissipation typically becomes an important issue since it is desirable to offer the greatest over-voltage protection while having the resistance of the added resistor to be as small as possible.

SUMMARY OF THE INVENTION

Various embodiments of a protection circuit for protecting a device from destructive electrical conditions, such as electrostatic discharge (ESD), over-voltage, and over-current, while keeping the output impedance of the device's I/O lines to a minimum, self-regulating power dissipation, and using minimum sized components, are shown. In one embodiment, the device may be a data acquisition device comprised in a data acquisition system. The device may comprise one or more protection circuits coupled to each of one or more I/O lines. In one embodiment, the device may comprise a first protection circuit and a second protection circuit coupled to each of the I/O lines. The first protection circuit may provide a primary level of protection for the I/O line, and the second protection circuit may provide a secondary level of protection for the I/O line.

In one embodiment, the first protection circuit of the device may combine the use of Schottky diodes for voltage clamping, with a current limiting device for self-regulating the power dissipation therein. When the voltage is about to exceed the predetermined voltage limits corresponding to one or more components of the device, the Schottky diodes may protect the I/O line from over-voltage conditions by clamping or fixing the voltage at approximately the voltage limit. The Schottky diodes may sink or source any excess current to prevent the excessive voltage from damaging the circuitry of device. In one embodiment, the second protection circuit may include one or more voltage clamping diodes (e.g., pn-junction diodes) coupled to the I/O line to offer a second level of protection.

In one embodiment, the current limiting device of the first protection circuit may be operable to function as a small, low impedance resistor in a normal operating range and as a controlled power dissipater outside the normal operating range. The current limiting device may have a nominal impedance as long as the current passing through it is below a certain current limit, i.e., within the normal operating range. When the current limit is exceeded, the impedance of the current limiting device preferably starts increasing in such a way that the power dissipated by the device is kept under the maximum power tolerated by the device.

In one embodiment, the device also includes a first voltage rail associated with the first protection circuit and a second voltage rail associated with the second protection circuit. The first voltage rail may be decoupled from the second voltage rail by a high frequency filter to prevent high frequency transients from propagating to the second voltage rail. Additionally, the first protection circuit may include a transient suppressing device, which may be coupled to the first voltage rail to ground transients received via the one or more Schottky diodes.

In one embodiment, the device further comprises a voltage monitoring unit as an additional layer of protection from damaging electrical conditions. The voltage monitoring unit may implement a protection algorithm to monitor a voltage level being output via each of the I/O lines of the device. The voltage monitoring unit preferably compares the output voltage at each I/O line to a desired output voltage to determine whether an over-current condition exists at the I/O line. If the output voltage matches the desired voltage, then the device may continue the current operation. If the output voltage does not match the desired voltage, the voltage monitoring unit may disable the output to stop the over-current condition at I/O line. It is noted that the desired voltage may be a specific voltage or a particular voltage range.

In one embodiment, the voltage monitoring unit may comprise a counter unit, which may start counting down a predetermined amount of time when the over-current condition is detected. The voltage monitoring unit may disable the output if the over-current condition remains after the predetermined amount of time.

Figure 1:
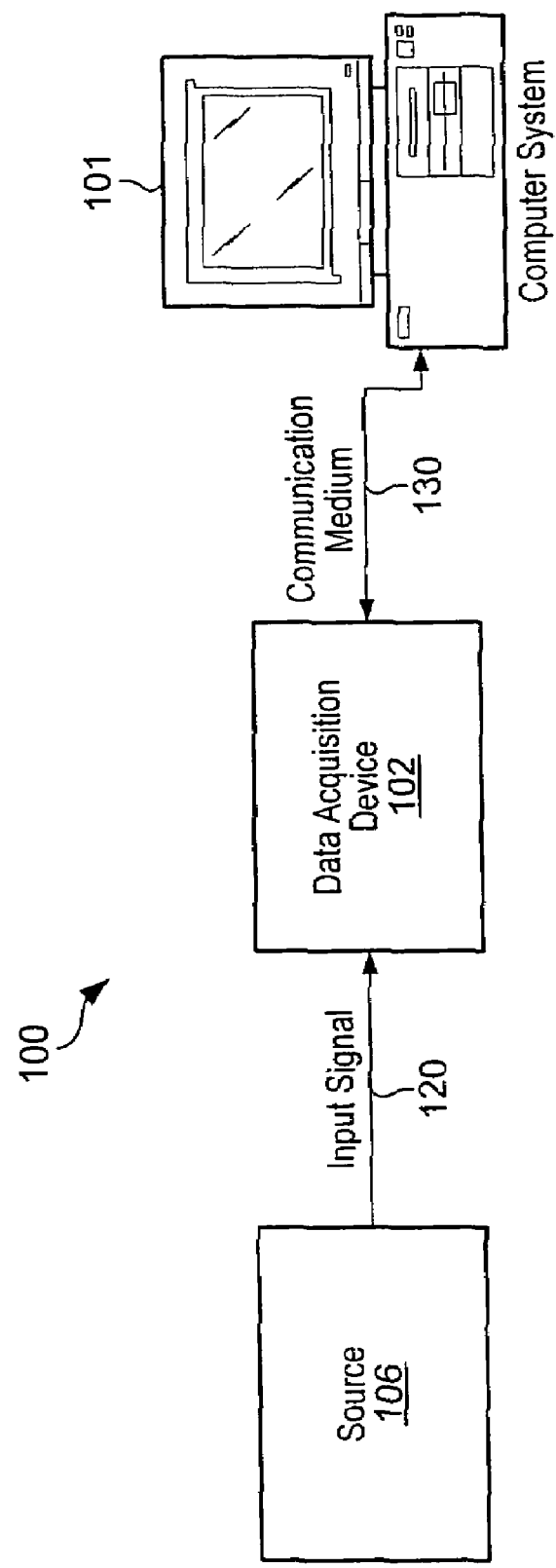
FIG. 1 is a diagram of one embodiment of a computer-based measurement system or data acquisition system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION

FIG. 1: Data Acquisition System

FIG. 1 is a diagram of one embodiment of a computer-based measurement system or data acquisition system 100. The data acquisition system 100 may comprise a computer system 101, which may be coupled to a measurement device, referred to as data acquisition (DAQ) device 102, through a communication medium 130. The DAQ device 102 may be an internal card or board coupled to a bus, e.g., a Peripheral Component Interconnect (PCI), PCI Express, Industry Standard Architecture (ISA), or Extended Industry Standard Architecture (EISA) bus, but is shown external to the computer 101 for illustrative purposes. The measurement device or DAQ device 102 may also be an external device coupled to the computer system 101. In this embodiment, the communication medium 130 may be a serial bus, such as USB, IEEE 1394, MXI bus, Ethernet, or a proprietary bus, or a parallel bus such as GPIB or others. It is noted that the communication medium 130 may be a wired or wireless communication medium.

The DAQ device 102 may be coupled to an external source 106, such as an instrument, sensor, transducer, or actuator from which the DAQ device 102 may receive an input signal 120, e.g., an analog input such as sensor data. In one example, the external source 106 may be a temperature sensor, which is comprised in a unit under test (UUT). In this example, the DAQ device 102 may receive temperature reading from the temperature sensor and convert the analog data to digital form to be sent to the computer system 101 for analysis. Additionally, the DAQ device 102 may receive a digital input, e.g., a binary pattern, from the external source 106 (e.g., a UUT). Furthermore, the DAQ device 102 may also produce analog or digital signals, e.g., for stimulating the UUT.

The computer system 101 may be operable to control the DAQ device 102. For example, the computer system 101 may be operable to direct the DAQ device 102 to perform an acquisition, and may obtain data from the DAQ device 102 for storage and analysis therein. Additionally, the computer system 101 may be operable to send data to the device 102 for various purposes, such as for use in generating analog signals used for stimulating a UUT.

The computer system 101 may include a processor, which may be any of various types, including an x86 processor, e.g., a Pentium™ class, a PowerPC™ processor, a CPU from the SPARC™ family of RISC processors, as well as others. Also, the computer system 101 may also include one or more memory subsystems (e.g., Dynamic Random Access Memory (DRAM) devices). The memory subsystems may collectively form the main memory of computer system 101 from which programs primarily execute. The main memory may be operable to store a user application and a driver software program. The user application may be executable by the processor to conduct the data acquisition/generation process. The driver software program may be executable by the processor to receive data acquisition/generation tasks from the user application and program the DAQ device 102 accordingly.

Figure 2:
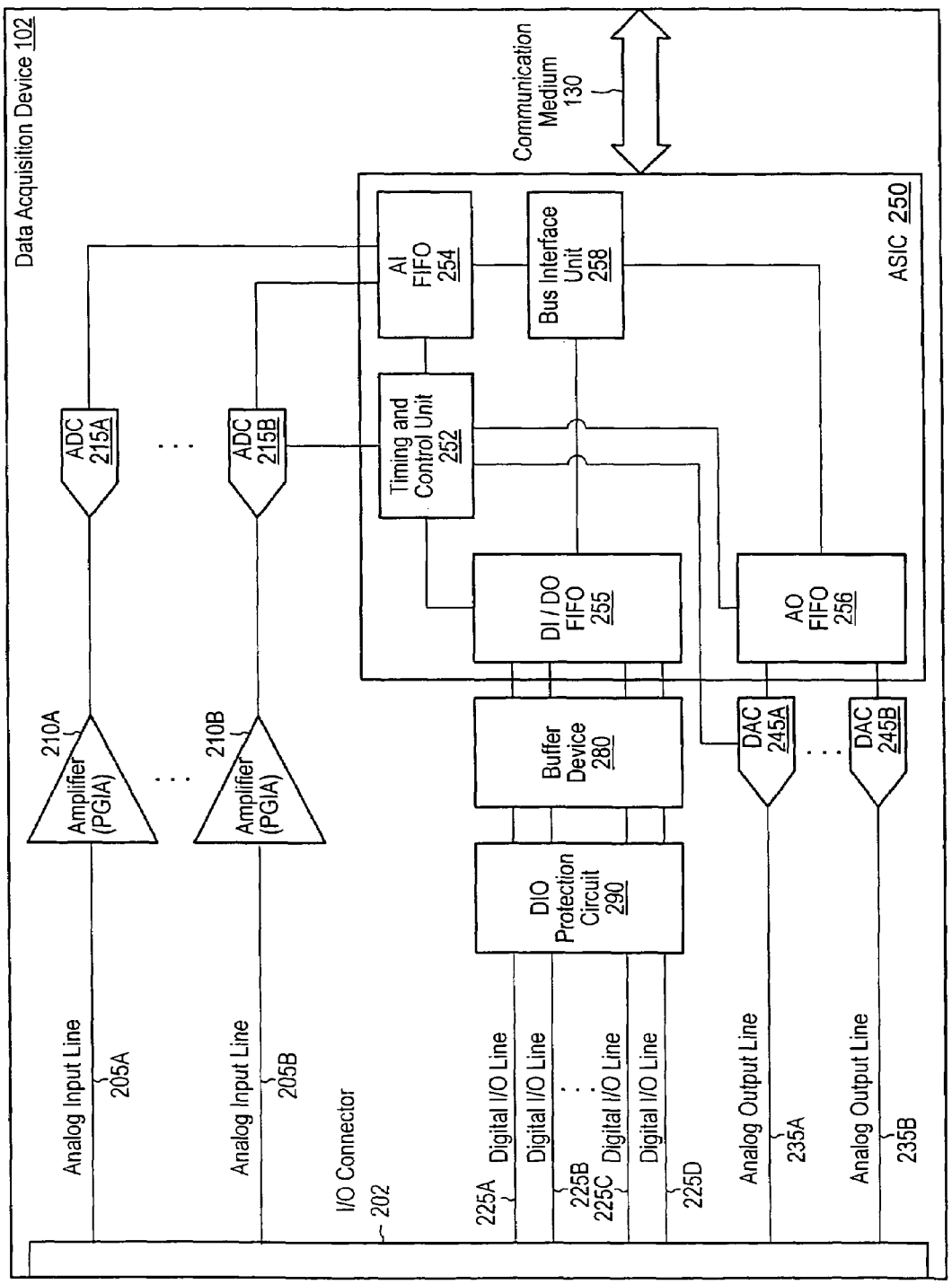
FIG. 2 is a block diagram of one embodiment of a data acquisition (DAQ) device.

FIG. 2: Data Acquisition Device

FIG. 2 is a block diagram of one embodiment of a data acquisition (DAQ) device 102. Components that correspond to those shown in FIG. 1 are numbered identically for simplicity and clarity. As described above, the DAQ device 102 may be an internal device coupled to, e.g., a PCI bus, or may also be an external device coupled to the computer system 101 via a serial bus, e.g., MXI bus, or a parallel bus, e.g., a GPIB. The DAQ device 102 may be a board or a module comprising one or more integrated circuits (ICs) or the DAQ device 102 may be an IC, for example, a mixed-signal IC.

The DAQ device 102 may comprise an input/output (I/O) connector 202, analog input lines 205A and 205B, amplifiers 210A and 210B, analog-to-digital converters (ADCs) 215A and 215B, digital I/O lines 225A, 225B, 225C, and 225D, analog output lines 235A and 235B, a timing and data control IC (e.g., application-specific integrated circuit (ASIC) 250), digital-to-analog converters (DACs) 245A and 245B, a buffer device 280, a DIO protection device 290, and communication medium 130. It should be noted that the components described with reference to FIG. 2 are meant to be exemplary only, and are not intended to limit the invention to any specific set of components or configurations. For example, in various embodiments, one or more of the components described may be omitted, combined, modified, or additional components included, as desired.

The DAQ device 102 may receive and send digital and/or analog data via the input and output lines of the I/O connector 202. For example, the I/O connector 202 may be coupled to a signal source (e.g., source 106 of FIG.1) comprised in a UUT to receive analog signals. The I/O connector 202 may comprise analog input lines 205A and 205B, which may convey the received analog signals to amplifier 210A and 210B. It is noted however that in other embodiments the DAQ device 102 may comprise any number of analog input lines, e.g., three or more analog input lines.

In one embodiment, amplifiers 210A and 210B may be programmable gain instrumentation amplifiers (PGIAs). PGIAs are typically differential amplifiers having a high input impedance and a gain that is adjustable through the variation of a single resistor. The amplifier 210A may apply a specified amount of gain to the input signal to ensure proper analog-to-digital conversion. Also, PGIAs may convert differential input signals into single-ended outputs, which may be needed for the ADC (e.g., ADC 215A) to correctly digitize the data. It is noted however that in other embodiments amplifier 210A and/or amplifier 210B may be other types of amplifiers typically used in data acquisition devices. It is also noted that DAQ device 102 may comprise any number of amplifiers, e.g., three or more amplifiers.

The output of amplifier 210A may be connected to ADC 215A, which may digitize the analog signals. ADCs are devices that convert a continuously varying (analog) signal into a discrete (digital) signal. The resolution of the ADC typically indicates the number of discrete values it can produce. For example, if the ADC has an eight-bit resolution, the ADC may be able to encode an analog input to one of 256 discrete values (since $2^8=256$). Each discrete value is derived by sampling the analog signal at a predetermined rate (i.e., the sampling rate of the ADC). More specifically, the signal values at particular time intervals are measured and stored. An ADC typically includes a sample and hold circuit, which holds the input value constant during the time the ADC performs the analog-to-digital conversion, since the ADC cannot make an instantaneous conversion. It is noted however that in other embodiments the DAQ device 102 may comprise any number of ADCs, for example, the DAQ device 102 may include a single ADC or four ADCs.

After the signals are digitized, the ADC 215A may send the digital signals to the ASIC 250. In one embodiment, the ASIC 250 may be a mixed-signal ASIC, which may be configured to perform the timing and data control functions for the DAQ device 102. It is noted however that in other embodiments other types of timing and data control ICs may be used. The ASIC 250 may include a timing and control unit 252, an analog input (AI) first-in first-out (FIFO) buffer 254, a digital input (DI)/digital output (DO) FIFO buffer 255, an analog output (AO) FIFO buffer 256, and a bus interface unit 258. It is noted that in other embodiments one or more of the components described may be omitted, combined, modified, or additional components included, as desired.

When the ASIC 250 receives the digitized signals, the data may be stored in AI FIFO buffer 254. FIFO buffers are storage devices that output the stored data in the order the data was received. After being stored in the AI FIFO buffer 254, the digitized data may be sent to the bus interface unit 258. In one embodiment, the bus interface unit 258 may be coupled to the communication medium 130 for sending data to and receiving data from a computer system (e.g., computer system 101 of FIG. 1). The bus interface unit 258 may be operable to implement the protocol associated with the type of bus coupled to the DAQ device 102. As described above, exemplary buses coupled to the bus interface unit 258 include a PCI, PCI Express, USB, IEEE 1394, PXI bus, or Ethernet, among others. In one embodiment, the bus interface unit 258 may send the digitized data to the computer system 101 for storage and analysis of the data.

As described above, the computer system (e.g., computer system 101 of FIG. 1) may provide digital signals to the DAQ device 102 to stimulate a UUT. In one embodiment, the digital signals may need to be converted to analog form to stimulate the UUT. Therefore, in this embodiment, after the ASIC 250 of DAQ device 102 receives the digital signals and stores them in AO FIFO buffer 256, the digital data may be transmitted to DAC 245A to be converted to analog form. DACs are devices that convert discrete (digital) signals into continuously varying (analog) signals. For example, if an analog signal was initially converted to digital form, a DAC may be able to reproduce the analog signal if provided with the digital data. It is noted that the DAQ device 102 may comprise any number of DACs, for example, other embodiments may include a single DAC or four DACs. After the digital data is converted to analog form, the analog signals may be sent to the I/O connector 202 via the analog output line 235A.

In one embodiment, digital signals may be received at the I/O connector 202. The received digital signals may be sent to the ASIC 250 via one or more of the digital I/O lines 225A-D. In one embodiment, the digital I/O lines 225A-D are general-purpose, bidirectional digital I/O lines, which may be configured to send and receive digital data. In one embodiment, each of the bidirectional digital I/O lines 225A-D may be connected to the DIO protection device 290, which may include a plurality of protection circuits. The protection circuits may protect the lines 225A-D and therefore the DAQ device 102 from destructive electrical conditions, such as electrostatic discharge (ESD), over-voltage, and over-current, while keeping the output impedance of the device's I/O lines to a minimum and self-regulating power dissipation (as will be further described below with reference to FIG. 3). In one embodiment, the buffer device 280 is coupled between the DIO protection circuit 290 and the ASIC 250 for buffering the one or more bidirectional digital I/O lines 225A-D. The buffer device 280 may include one or more bidirectional buffers for each I/O line, which may be configured as either an input or an output. When the ASIC 250 receives the digital signals, the data may be stored in the DI/DO FIFO buffer 255. After being stored in the DI/DO FIFO buffer 255, the digital data may be sent to the bus interface unit 258, which may convey the digital data to the computer system 101, as described above. It is noted that digital data received via the bus interface unit 258 may also be stored in DI/DO FIFO buffer 255 before being sent to the I/O connector 202 via one or more of the digital I/O lines 225A-D.

The ASIC 250 may include the timing and control unit 252 to provide timing and control and data management functions for the DAQ device 102 during, e.g., a data acquisition process. The timing and control unit may comprise one or more counter/timers, which may be used in various applications, including counting the occurrences of a digital event, digital pulse timing, and generating square waves and pulses. The timing and control unit 252 may be coupled to one or more of the FIFO buffers (e.g., AO FIFO buffer 256) of the DAQ device 102 to provide timing and control signals for storing data received from, e.g., the bus interface 258 or the ADC 215A, and for sending data to, e.g., DAC 245A. Furthermore, the timing and control unit 252 may be coupled to the ADCs (e.g., ADC 215A) and DACs (e.g., ADC 245A) of the DAQ device 102 to provide timing and control signals for performing the data conversion functions that may be necessary in a data acquisition process.

In one embodiment, the timing and control unit 252 and/or the bus interface unit 258 may be implemented in hardware. In a further embodiment, the timing and control unit 252 and/or the bus interface unit 258 may be implemented in software. In yet another embodiment, the timing and control unit 252 and/or the bus interface unit 258 may be implemented in both hardware and software. In one embodiment, the functionality described above with regard to the timing and control unit 252 and/or the bus interface unit 258 may be distributed across multiple components. In various embodiments, this type of functional distribution may also apply to other components described herein.

Figure 3:
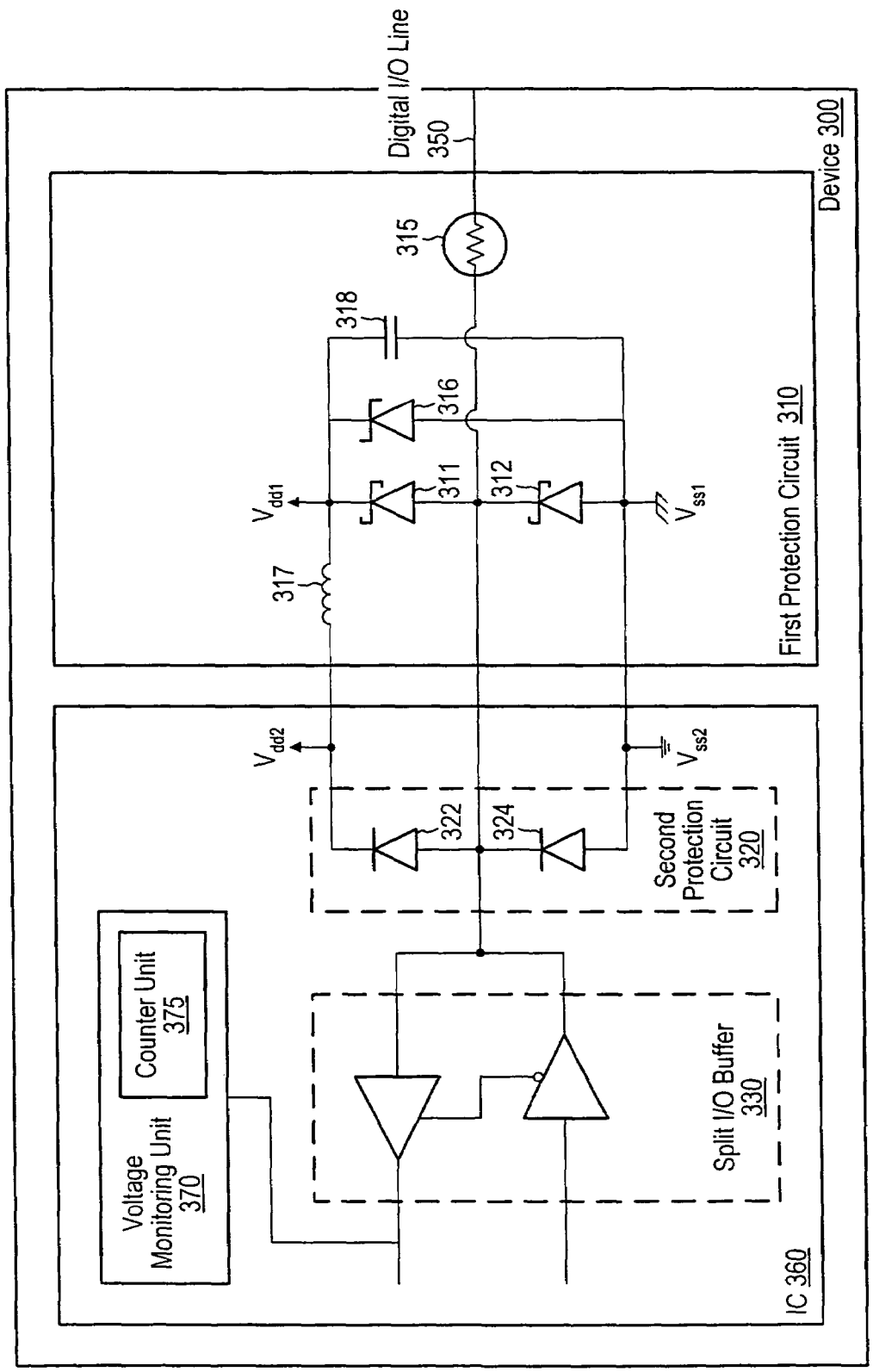
FIG. 3 is a block diagram of one embodiment of a device comprising circuitry for protecting the device from destructive electrical conditions.

FIG. 3: Protection Circuit

Turning now to FIG. 3, a block diagram of one embodiment of a device comprising circuitry for protecting the device from destructive electrical conditions is shown. The device 300 may be a board or a module comprising one or more integrated circuits (ICs) or the device 300 may be an IC, for example, a mixed-signal IC. More specifically, the device 300 may be any type of device comprising one or more digital input/output (I/O) lines, such as the data acquisition device 102 of FIG. 2, a PCI extension for instrumentation (PXI) module, a graphics card, an Ethernet card, and a disk drive, among others. Additionally, the device 300 may be comprised in any type of system (e.g., computer system 101), such as desktops, portable appliances, servers, communication products, workstations, and instrumentation chassis, among others. The protection circuitry may protect the digital I/O lines of the device 300 from damaging electrical conditions, such as electrostatic discharge (ESD), over-voltage, and over-current, while keeping the output impedance of the lines to a minimum, self-regulating power dissipation, and using minimum sized components.

The device 300 (e.g., data acquisition device 102 of FIG. 2) may comprise one or more protection circuits coupled to each of one or more general-purpose, bidirectional digital I/O lines. In one embodiment, the device 300 may comprise a first protection circuit 310 and a second protection circuit 320 coupled to each of the general-purpose digital I/O lines (e.g., digital I/O line 350). The first protection circuit 310 may provide a primary level of protection for the digital I/O line 350, and the second protection circuit 320 may provide a secondary level of protection for the digital I/O line 350. The first protection circuit 310 may comprise one or more Schottky diodes (e.g., diodes 311 and 312), a current limiting device 315, a transient suppressor 316, a first voltage rail from $V_{dd1}$ to $V_{ss1}$, and a high frequency filter 317. In one embodiment, the first protection circuit 310 may be an IC (e.g., a protection circuit comprised in the DIO protection device 290 of FIG. 2) of device 300 (e.g., the data acquisition device 102 of FIG. 2). The second protection circuit 320 may comprise one or more diodes (e.g., pn-junction diodes 322 and 324) coupled to the digital I/O line 350 and a second voltage rail from $V_{dd2}$ to $V_{ss2}$. In one embodiment, the second protection circuit 320 may be comprised in an IC 360 (e.g., the buffer device 280 of FIG. 2) of device 300 (e.g., the data acquisition device 102 of FIG. 2). In this embodiment, the IC 360 may comprise a split I/O buffer 330, which may be coupled to the digital I/O line 350 to control the state (i.e., input or output) of the line 350.

It should be noted that the components described with reference to FIG. 3 are meant to be exemplary only, and are not intended to limit the invention to any specific set of components or configurations. For example, in various embodiments, one or more of the components described may be omitted, combined, modified, or additional components included, as desired.

The first protection circuit 310 of device 300 may combine the use of the Schottky diodes 311 and 312 for voltage clamping, with the current limiting device 315 for self-regulating the power dissipated therein. Schottky diodes are diodes that include a metal-to-semiconductor junction instead of a semiconductor-to-semiconductor junction (e.g., pn-junction). As the name implies, the junction consists of a metal in contact with a layer of semiconductor material (e.g., an aluminum layer in contact with an n-type silicon substrate). In one embodiment, Schottky clamping diodes (e.g., diodes 311 and 312) may be used instead of regular pn-junction diodes in a protection circuit (e.g., the first protection circuit 310) to help protect components (e.g., IC 360) with internal ESD protection clamping diodes (e.g., the second protection circuit 320 including pn-junction diodes 322 and 324) from damaging electrical conditions. The second protection circuit 320 is typically designed to only clamp ESD events which are very short in duration; therefore, the first protection circuit 310 may be necessary to protect components from long-lasting over-voltage events. It is noted that one or more additional protection circuits, e.g., similar to first protection circuit 310, may be coupled to one or more additional I/O lines of device 300 to provide protection to other ICs or components within device 300.

Voltage clamping is the limiting of a voltage at a node by using, for example, a pair of anti-parallel diodes (e.g., Schottky diodes 311 and 312). Voltage clamping limits the node voltage to a certain range, which is typically determined by the particular diodes and voltage rails used in the circuit. In device 300 of FIG. 3, when the voltage is about to exceed the predetermined voltage limits corresponding to one or more components of device 300 (e.g., IC 360), the Schottky diodes 311 and 312 may protect the digital I/O line 350 from over-voltage conditions by clamping or fixing the voltage at approximately the voltage limit. The Schottky diodes 311 and 312 may sink or source any excess current necessary to prevent the excessive voltage from damaging the circuitry of device 300. Typically, Schottky diodes have a lower forward voltage drop (i.e., approximately 0.2V) at a given current compared to pn-junction diodes (i.e., approximately 0.7V). Therefore, Schottky diodes may begin to sink excess current quicker than pn-junction diodes. For example, if the predetermined voltage limit is 5V, the Schottky diodes 311 and 312 may turn on when the node voltage is approximately 5.2V, whereas if the circuit included pn-junction diodes instead of Schottky diodes, the pn-junction diodes may turn on when the node voltage reached approximately 5.7V.

Additionally, Schottky diodes typically have a lower resistance than pn-juction diodes. Therefore, when Schottky diodes 311 and 312 are used as external clamping diodes on digital I/O line 350 with the internal pn-junction diodes 322 and 324, most of the current may flow through the Schottky diodes 311 and 312 instead of the pn-junction diodes 322 and 324, which are not designed to carry the high levels of current necessary for over-voltage protection. Since the Schottky diodes 311 and 312 may sink most of the current, the protection circuitry may minimize the risk of latchup and may also allow a higher over-voltage protection limit. It is noted however that in other embodiments other device(s) typically used for voltage clamping may replace the Schottky diodes or may be included with the Schottky diodes in the first protection circuit 310. For example, in some embodiments, any type of diode with a relatively low forward voltage, compared with the diodes on the second protection circuit (e.g., diodes 322 and 324), may be used for voltage clamping in the first protection circuit 310.

As shown in FIG. 3, the current limiting device 315 may be coupled in series with the digital I/O line 350 to be protected and may further be coupled to the Schottky diodes 311 and 312. In one embodiment, the current limiting device 315 may be operable to function as a small, low impedance resistor in a normal operating range and as a controlled power dissipater outside the normal operating range. The normal operating range may be a specific current range associated with the operation of the current limiting device 315, for example, the normal operating range of the current limiting device 315 may be from 0 mA to 50 mA. It is noted however that the normal operating range may vary from one current limiting device 315 to another.

The current limiting device 315 may have a nominal impedance as long as the current passing through it is below a certain current limit, i.e., within the normal operating range. Since the output impedance at the line is low during the normal operation (due to the nominal impedance of the current limiting device 315), the current limiting device 315 may not degrade the performance of the device 300. When the current limit is exceeded, the impedance of the current limiting device 315 preferably starts increasing in such a way that the power dissipated by the device 315 is kept under the maximum power tolerated by the device 315. In one embodiment, after the current limit is breached, the impedance of the current limiting device 315 may increase over time at a constant rate. In other embodiments, after the current limit is breached, the impedance of the current limiting device 315 may increase over time at a variable rate.

The self-regulation of power dissipation of the current limiting device 315 typically helps provide a higher level of protection for the digital I/O line 350, because it may ensure that the maximum power for the current limiting device 315 is never exceeded. Provided that the maximum steady state current of the current limiting device 315 is within the limits of the continuous current for the Schottky diodes 311 and 312, the circuit may remain in this mode indefinitely.

Figure 4:
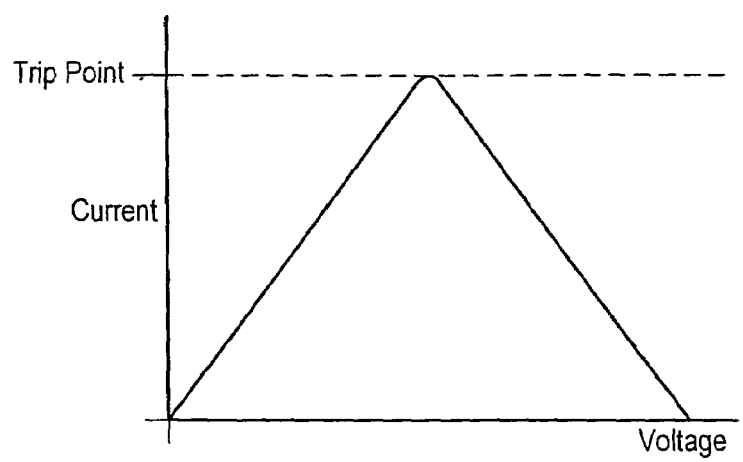
FIG. 4 is a graph illustrating the I-V curve for a positive thermal coefficient resistor, according to one embodiment of the invention.

An example of the current limiting device 315 with the above-described properties is a positive temperature coefficient (PTC) resistor, which has a current limit or trip point at a given current level. A PTC resistor typically functions as a resistor below the trip point, i.e., within the normal operating range. When the current rises beyond the trip point, the PTC resistor typically heats up because of the extra power dissipation, causing an increase in the impedance of the PTC resistor. The increase in the impedance typically causes a decrease in current flow through the PTC resistor and an increase in the voltage drop therein. FIG. 4 is a graph illustrating the I-V curve for a typical positive temperature coefficient resistor, which shows the reversal of the current flowing through the PTC resistor at the trip point, according to one embodiment of the invention. It is noted however that other current limiting devices with similar properties as PTC resistor may be used in the first protection circuit 310.

Referring back to FIG. 3, in one embodiment, the first protection circuit 310 of the device 300 may further include a separate voltage rail (e.g., the first voltage rail from $V_{dd1}$ to $V_{ss1}$,) for clamping that is decoupled from the main voltage rail (e.g., the second voltage rail from $V_{dd2}$ to $V_{ss2}$) by a high frequency filter 317. The decoupling of the first voltage rail from the second voltage rail may prevent transients from propagating to the second voltage rail and affecting the functionality of the circuitry of device 300. The high frequency filter 317 may be, for example, an inductor. The high frequency filter 317 is typically included in the first protection circuit 310 to prevent a high-speed transient, such as ESD, from reaching, e.g., the IC 360. Furthermore, in one embodiment, the first protection circuit 310 may also include a transient suppressor 316, which may be operable to quickly ground any transient that is redirected to the first voltage rail by the Schottky clamping diodes 311 and 312. The transient suppressor 316 may be, for example, a zener diode.

In one example, when there is a high-speed transient on the digital I/O line 350, the Schottky diodes 311 and 312 may begin voltage clamping and the excess current may be sent toward the high frequency filter 317. The filter 317 may block the transient from reaching the IC 360 for a limited amount of time. However, after this time, the current may either go up the second voltage rail to the voltage source associated with the second voltage rail or to the transient suppressor 316. If the current goes up the voltage rail, then it may start raising the voltage of the rail; therefore, the current should preferably go toward the transient suppressor 316. In one embodiment, if the positive voltage rail is 5V, the transient suppressing path of the first protection circuit 310 is preferably designed to include a, e.g., 5.2V zener diode (the transient suppressor 316). In this embodiment, when a transient causes the voltage to rise above the 5.2V limit, the zener diode may change to a low impedance device and redirect the excess current to ground (e.g., $V_{ss1}$). Since the current may be redirected to ground, the positive voltage rail is maintained at approximately 5V. The transient suppressor 316 offers another level of protecting for both transient having a short duration (e.g., ESD) and for long-term over-voltage conditions. It is noted however that in other embodiments the high frequency filter 317 and the transient suppressor 316 may be replace by other devices having similar properties as the devices described above.

In one embodiment, the first protection circuit 310 further includes a capacitor 318 coupled in parallel to the transient suppressor 316. In this embodiment, after the Schottky diodes 311 and 312 redirect the excess current, the capacitor 318 may be charged until the voltage limit of the transient suppressor 316 is breached. As described above, when the voltage limit is exceeded, the transient suppressor 316 may change to a low impedance device and may ground the current to $V_{ss1}$. In one embodiment, $V_{ss1}$ may be shorted to $V_{ss2}$. In another embodiment, $V_{ss1}$ may be disconnected from $V_{ss2}$. In other embodiments, a resistive device may be coupled between $V_{ss1}$ and $V_{ss2}$.

The device 300 may further comprise a voltage monitoring unit 370 as an additional layer of protection from damaging electrical conditions. The voltage monitoring unit 370 may be operable to implement a protection algorithm to monitor a voltage level being output via each of the general-purpose, bidirectional digital I/O lines (e.g., digital I/O line 350) of the device 300. The voltage monitoring unit 370 preferably compares the output voltage at digital I/O line 350 to a desired output voltage to determine whether an over-current condition exists at the digital I/O line 350. If the output voltage matches the desired voltage, then the device 300 may continue the current operation. If the output voltage does not match the desired voltage, the voltage monitoring unit 370 may disable the output to stop the over-current condition at digital I/O line 350. It is noted that the desired voltage may be a specific voltage or a particular voltage range (e.g., from 3V to 5V).

Depending on the configuration of the split I/O buffer 330, the general-purpose, bidirectional digital I/O line 350 may be functioning as an input or as an output. The voltage monitoring unit 370 preferably protects the digital I/O line 350 when working as an output against severe over-current conditions, such as a hard short circuit to ground when the signal was intended to drive a logic high value (e.g., a voltage such as $V_{dd}$=5V).

Figure 5A:
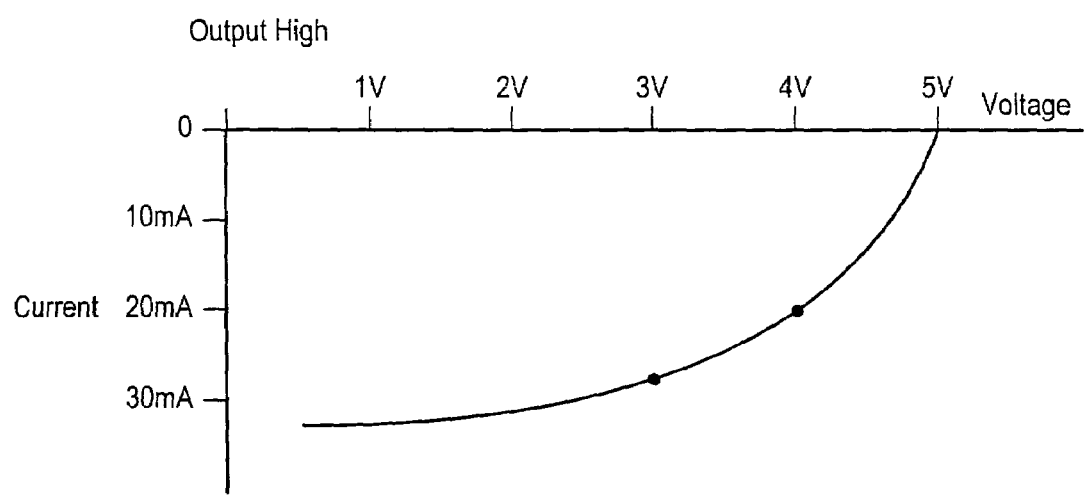
FIG. 5A is a graph illustrating the I-V curve when one of the bidirectional digital I/O lines of the device is driving a logic high output, according to one embodiment of the invention.
Figure 5B:
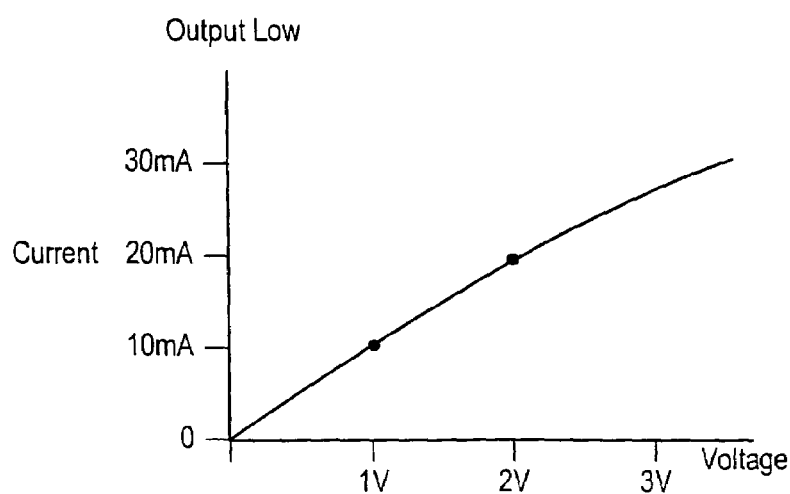
FIG. 5B is a graph illustrating the I-V curve when one of the bidirectional digital I/O lines of the device is driving a logic low output, according to one embodiment of the invention.

When the bidirectional digital I/O line 350 is set as an output, the line may either drive a logic 1 (i.e., logic high), which may be represented as $V_{dd}$, or logic 0 (i.e., logic low), which may be represented as $V_{ss}$. When the pin of device 300, which is coupled to the I/O line 350, is driving $V_{dd}$, the voltage typically drops towards $V_{ss}$ as the current pulled out of the pin increases, as shown in FIG. 5A according to one embodiment of the invention. If the output current is too large, at some point the output voltage may drop so much that it may no longer be read as a logic high. For example, the output may be considered logic high if it is within the range of 3V to 5V. A similar effect may occur when driving Vss. The voltage on the pin typically increases as the current into the pin increases, as shown in FIG. 5B according to one embodiment of the invention. If the current is too large, the voltage at the pin will no longer be read as logic low. The voltage monitoring unit 370 takes advantage of the properties described above to implement the protection algorithm. Also, since the line is bidirectional and the voltage monitoring unit 370 is coupled to the split I/O buffer 330, the device 300 can monitor (via voltage monitoring unit 370) the voltage being output by the pin in real time.

Typically, the voltage monitoring unit 370 needs to detect an over-current condition that lasts longer than a specified limit to implement the protection algorithm. Therefore, the voltage monitoring unit 370 may comprise a counter unit 375, which may be operable to start counting down a predetermined amount of time when the over-current condition is detected at the output. If the counter unit 375 times out and the over-current condition still exists, then the voltage monitoring unit 370 may take preventive actions such as disabling the output having the over-current condition. For example, if the output is accidentally shorted to ground, after the predetermined amount of time, the output may be disabled to prevent the device from over-current related damage. Furthermore, the voltage monitoring unit 370 may generate an interrupt to notify the CPU of the over-current condition, so further actions may be taken to correct the problem (e.g., disable the output to prevent damage to the device 300). It is noted that in other embodiments the counter unit 375 may be implemented as a timer or as another counting mechanism.

In one embodiment, the voltage monitoring unit 370 and/or the counter unit 375 may be implemented in software. It is noted however that in some embodiments the voltage monitoring unit 370 and/or the counter unit 375 may be implemented in hardware. It is also noted that in other embodiments the voltage monitoring unit 370 and/or the counter unit 375 may be implemented in both hardware and software. In one embodiment, the functionality described above with regard to the voltage monitoring unit 370 and/or the counter unit 375 may be distributed across multiple components. In various embodiments, this type of functional distribution may also apply to other components described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising circuitry for protecting the apparatus from destructive electrical conditions, the apparatus comprising:
   one or more input/output (I/O) lines;
   a first protection circuit coupled to an I/O line and operable to provide a primary level of protection for the I/O line, the first protection circuit comprising:
      one or more diodes directly connected to the I/O line for voltage clamping, and
      a current limiting device coupled to the I/O line and to the one or more diodes, wherein the current limiting device is operable to function as a low impedance device in a normal operating range and to function as a controlled power dissipater outside of the normal operating range; and
   a second protection circuit coupled to the first protection circuit and to the I/O line, wherein the second protection circuit is operable to provide a secondary level of protection for the I/O line, wherein the second protection circuit comprises one or more diodes directly connected to the I/O line for voltage clamping;
   wherein the one or more diodes of the first protection circuit are coupled between the current limiting device and the one or more diodes of the second protection circuit;
   wherein the one or more diodes comprised in the first protection circuit have a lower forward voltage drip compared to the one or more diodes comprised in the second protection circuit.

2. The apparatus of claim 1, wherein the one or more diodes comprised in the first protection circuit are Schottky diodes and the one or more diodes comprised in the second protection circuit are pn-junction diodes.

3. The apparatus of claim 1, further comprising a first voltage rail associated with the first protection circuit and a second voltage rail associated with the second protection circuit, wherein a high frequency filter is operable to decouple the first voltage rail from the second voltage rail to prevent high frequency transients from propagating to the second voltage rail.

4. The apparatus of claim 3, wherein the high frequency filter comprises an inductor.

5. The apparatus of claim 3, further comprising a transient suppressing device coupled to the first voltage rail, wherein the transient suppressing device is operable to ground transients received via the one or more diodes of the first protection circuit.

6. The apparatus of claim 5, wherein the transient suppressing device comprises a zener diode.

7. The apparatus of claim 1, wherein the first protection circuit is comprised in a first integrated circuit of the apparatus, and the second protection circuit is comprised in a second integrated circuit of the apparatus.

8. The apparatus of claim 1, wherein the current limiting device is operable to function as a controlled power dissipater if the current passing therein exceeds a current threshold, wherein the impedance of the current limiting device increases if the current threshold is exceeded.

9. The apparatus of claim 1, wherein the current limiting device comprises a positive thermal coefficient resistor.

10. The apparatus of claim 1, further comprising a voltage monitoring unit operable to monitor a voltage level to be output via the I/O line, wherein in said monitoring the output voltage, the voltage monitoring unit is operable to compare the output voltage to a desired output voltage to detect an over-current condition at the I/O line.

11. The apparatus of claim 10, wherein in said monitoring the output voltage, if the output voltage does not match the desired output voltage, the voltage monitoring unit is further operable to disable the output.

12. The apparatus of claim 11, further comprising a counter unit operable to start counting down a predetermined amount of time when the over-current condition is detected, wherein the voltage monitoring unit is operable to disable the output if the over-current condition remains after the predetermined amount of time.

13. The apparatus of claim 1, further comprising a split I/O buffer coupled to the second protection circuit and to the I/O line, wherein the split I/O buffer is configured to control the I/O state of the I/O line.

14. A data acquisition device comprising circuitry to protect the device from destructive electrical conditions, the data acquisition device comprising:
   one or more input/output (I/O) lines;
   a first protection circuit coupled to an I/O line and operable to provide a primary level of protection for the I/O line, the first protection circuit comprising:
      one or more Schottky diodes directly connected to the I/O line for voltage clamping, and
      a current limiting device coupled to the I/O line and the one or more Schottky diodes, wherein the current limiting device is operable to function as a low impedance device in a normal operating range and to function as a controlled power dissipater outside of the normal operating range; and
   a second protection circuit coupled to the first protection circuit and to the I/O line, wherein the second protection circuit is operable to provide a secondary level of protection for the I/O line, the second protection circuit comprising one or more pn-junction diodes directly connected to the I/O line for voltage clamping;
   wherein the one or more Schottky diodes of the first protection circuit are coupled between the current limiting device and the one or more pn-junction diodes of the second protection circuit.

15. The data acquisition device of claim 14, wherein the first protection circuit is comprised in a first integrated circuit of the data acquisition device, and the second protection circuit is comprised in a second integrated circuit of the data acquisition device.

16. The data acquisition device of claim 14, further comprising a transient suppressing device coupled to the first voltage rail, wherein the transient suppressing device is operable to ground transients received via the one or more Schottky diodes.

17. The data acquisition device of claim 16, wherein the transient suppressing device comprises a zener diode.

18. The data acquisition device of claim 14, wherein the current limiting device is operable to function as a controlled power dissipater if the current passing therein exceeds a current threshold, wherein the impedance of the current limiting device increases if the current threshold is exceeded.

19. The data acquisition device of claim 14, wherein the current limiting device comprises a positive thermal coefficient resistor.

20. The data acquisition device of claim 14, further comprising a voltage monitoring unit operable to monitor a voltage level being output via the I/O line, wherein in said monitoring the output voltage, the voltage monitoring unit is operable to compare the output voltage to a desired output voltage to detect an over-current condition at the I/O line.

21. The data acquisition device of claim 20, wherein in said monitoring the output voltage, if the output voltage does not match the desired output voltage, the voltage monitoring unit is further operable to disable the output.

22. The data acquisition device of claim 21, further comprising a counter unit operable to start counting down a predetermined amount of time when the over-current condition is detected, wherein the voltage monitoring unit is operable to disable the output if the over-current condition remains after the predetermined amount of time.

23. The data acquisition device of claim 14, further comprising a first voltage rail associated with the first protection circuit and a second voltage rail associated with the second protection circuit, wherein a high frequency filter is operable to decouple the first voltage rail from the second voltage rail to prevent high frequency transients from propagating to the second voltage rail.

24. A data acquisition system, comprising:
a computer system for processing data obtained from one or more data acquisition processes; and
a data acquisition device coupled to the computer system for implementing the data acquisition processes and comprising circuitry to protect the device from destructive electrical conditions, the data acquisition device comprising:
one or more input/output (I/O) lines;
a first protection circuit coupled to an I/O line and operable to provide a primary level of protection for the I/O line, the protection circuit comprising:
one or more Schottky diodes directly connected to the I/O line for voltage clamping, and
a current limiting device coupled to the I/O line and the one or more Schottky diodes, wherein the current limiting device is operable to function as a low impedance device in a normal operating range and to function as a controlled power dissipater outside of the normal operating range; and
a second protection circuit coupled to the first protection circuit and to the I/O line, wherein the second protection circuit is operable to provide a secondary level of protection for the I/O line, the second protection circuit comprising:
one or more pn-junction diodes directly connected to the I/O line for voltage clamping;
wherein the one or more Schottky diodes of the first protection circuit are coupled between the current limiting device and the one or more pn-junction diodes of the second protection circuit.

25. The data acquisition system of claim 24, further comprising a signal source coupled to the data acquisition device and operable to provide the data acquisition device with an input signal.

26. The data acquisition system of claim 25, wherein the signal source is a sensor comprised in a unit under test (UUT), wherein the signal source is operable to provide the data acquisition device with sensor data.

27. The data acquisition system of claim 24, further comprising a first voltage rail associated with the first protection circuit and a second voltage rail associated with the second protection circuit, wherein a high frequency filter is operable to decouple the first voltage rail from the second voltage rail to prevent high frequency transients from propagating to the second voltage rail.

28. The data acquisition system of claim 27, further comprising a transient suppressing device coupled to the first voltage rail, wherein the transient suppressing device is operable to ground transients received via the one or more Schottky diodes.

29. The data acquisition system of claim 24, wherein the current limiting device is operable to function as a controlled power dissipater if the current passing therein exceeds a current threshold, wherein the impedance of the current limiting device increases if the current threshold is exceeded.

30. The data acquisition system of claim 24, further comprising a voltage monitoring unit operable to monitor a voltage level being output via the I/O line, wherein in said monitoring the output voltage, the voltage monitoring unit is operable to compare the output voltage to a desired output voltage to detect an over-current condition at the I/O line.

31. The data acquisition system of claim 30, wherein in said monitoring the output voltage, if the output voltage does not match the desired output voltage, the voltage monitoring unit is further operable to disable the output.

32. The data acquisition system of claim 31, further comprising a counter unit operable to start counting down a predetermined amount of time when the over-current condition is detected, wherein the voltage monitoring unit is operable to disable the output if the over-current condition remains after the predetermined amount of time.

33. An apparatus comprising circuitry for protecting the apparatus from destructive electrical conditions, the apparatus comprising:
a plurality of input/output (I/O) lines;
a first integrated circuit coupled to the plurality of I/O lines, wherein the first integrated circuit includes a plurality of first protection circuits, each first protection circuit coupled to a corresponding I/O line and operable to provide a primary level of protection for the I/O line, wherein each of the first protection circuits comprises:
one or more diodes directly connected to the I/O line for voltage clamping, and
a current limiting device coupled to the I/O line and to the one or more diodes, wherein the current limiting device is operable to function as a low impedance device in a normal operating range and to function as a controlled power dissipater outside of the normal operating range; and
a second integrated circuit coupled to the first integrated circuit and to the I/O lines, wherein the second integrated circuit includes a plurality of second protection circuits, each second protection circuit coupled to a corresponding first protection circuit and I/O line and operable to provide a secondary level of protection for the I/O line, wherein each of the second protection circuits comprises one or more diodes directly connected to the I/O line for voltage clamping;
wherein, for each first protection circuit and corresponding second protection circuit, the one or more diodes of the first protection circuit are coupled between the current limiting device and the one or more diodes of the second protection circuit;
the one or more diodes comprised in the first protection circuit have a lower forward voltage drop compared to the one or more diodes comprised in the second protection circuit.

34. An apparatus comprising circuitry for protecting the apparatus from destructive electrical conditions, the apparatus comprising:

one or more input/output (I/O) lines;

a first protection circuit coupled to an I/O line and operable to provide a primary level of protection for the I/O line, the first protection circuit comprising:

one or more diodes connected to the I/O line for voltage clamping, and a current limiting device coupled to the I/O line and to the one or more diodes, wherein the current limiting device is operable to function as a low impedance device in a normal operating range and to function as a controlled power dissipater outside of the normal operating range;

a second protection circuit coupled to the first protection circuit and to the I/O line, wherein the second protection circuit is operable to provide a secondary level of protection for the I/O line, wherein the second protection circuit comprises one or more diodes connected to the I/O line for voltage clamping; and a split I/O buffer coupled to the second protection circuit and to the I/O line, wherein the split I/O buffer is configured to control the I/O state of the I/O line;

wherein the one or more diodes of the first protection circuit are coupled between the current limiting device and the one or more diodes of the second protection circuit.

35. The apparatus of claim 34, wherein the one or more diodes comprised in the first protection circuit have a lower forward voltage drop compared to the one or more diodes comprised in the second protection circuit.

36. The apparatus of claim 35, wherein the one or more diodes comprised in the first protection circuit are Schottky diodes and the one or more diodes comprised in the second protection circuit are pn-junction diodes.

37. The apparatus of claim 34, further comprising a first voltage rail associated with the first protection circuit and a second voltage rail associated with the second protection circuit, wherein a high frequency filter is operable to decouple the first voltage rail from the second voltage rail to prevent high frequency transients from propagating to the second voltage rail.

38. The apparatus of claim 37, wherein the high frequency filter comprises an inductor.

39. The apparatus of claim 37 further comprising a transient suppressing device coupled to the first voltage rail, wherein the transient suppressing device is operable to ground transients received via the one or more diodes of the first protection circuit.

40. The apparatus of claim 39, wherein the transient suppressing device comprises a zener diode.

41. The apparatus of claim 34, wherein the current limiting device is operable to function as a controlled power dissipater if the current passing therein exceeds a current threshold, wherein the impedance of the current limiting device increases if the current threshold is exceeded.

42. The apparatus of claim 34, wherein the current limiting device comprises a positive thermal coefficient resistor.

43. The apparatus of claim 34, further comprising a voltage monitoring unit operable to monitor a voltage level to be output via the I/O line, wherein in said monitoring the output voltage, the voltage monitoring unit is operable to compare the output voltage to a desired output voltage to detect an over-current condition at the I/O line.

44. The apparatus of claim 43, wherein in said monitoring the output voltage, if the output voltage does not match the desired output voltage, the voltage monitoring unit is further operable to disable the output.

45. The apparatus of claim 44, further comprising a counter unit operable to start counting down a predetermined amount of time when the over-current condition is detected, wherein the voltage monitoring unit is operable to disable the output if the over-current condition remains after the predetermined amount of time.

46. The apparatus of claim 34, wherein the first protection circuit is comprised in a first integrated circuit of the apparatus, and the second protection circuit is comprised in a second integrated circuit of the apparatus.

* * * * *

UNITED STATES PATENT AND TRADEMARK OFFICE
CERTIFICATE OF CORRECTION

| | | |
|---|---|---|
| PATENT NO. | : 7,649,726 B2 | Page 1 of 1 |
| APPLICATION NO. | : 10/936632 | |
| DATED | : January 19, 2010 | |
| INVENTOR(S) | : Rafael Castro | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 267 days.

Signed and Sealed this

Twenty-third Day of November, 2010

David J. Kappos
*Director of the United States Patent and Trademark Office*